US008671013B2

(12) United States Patent
Cobb et al.

(10) Patent No.: US 8,671,013 B2
(45) Date of Patent: Mar. 11, 2014

(54) SYSTEM AND METHOD FOR MANAGING CONTROLS WITHIN A HETEROGENEOUS ENTERPRISE ENVIRONMENT

(75) Inventors: Richard M. Cobb, Great Falls, VA (US);
Steven J. Elliott, Humble, TX (US);
Thomas Garrity, III, Ashburn, VA (US); Prashanth V. Boccasam, Bethesda, MD (US); Silas S. Matteson, Oakton, VA (US)

(73) Assignee: Infor (US), Inc., Alpharetta, GA (US)

( * ) Notice: Subject to any disclaimer, the term of this patent is extended or adjusted under 35 U.S.C. 154(b) by 1289 days.

(21) Appl. No.: 11/742,950

(22) Filed: May 1, 2007

(65) Prior Publication Data

US 2007/0288253 A1 Dec. 13, 2007

Related U.S. Application Data

(60) Provisional application No. 60/796,186, filed on May 1, 2006.

(51) Int. Cl.
*G06Q 10/00* (2012.01)

(52) U.S. Cl.
USPC .......................................................... 705/7.38

(58) Field of Classification Search
USPC ............................................... 705/7.11, 7.38
See application file for complete search history.

(56) References Cited

U.S. PATENT DOCUMENTS

| | | | |
|---|---|---|---|
| 5,197,005 A | 3/1993 | Shwartz et al. | 364/419 |
| 5,216,592 A | 6/1993 | Mann et al. | 364/401 |
| 5,710,900 A | 1/1998 | Anand et al. | 395/339 |
| 5,832,496 A | 11/1998 | Anand et al. | 707/102 |
| 5,872,971 A | 2/1999 | Knapman et al. | 395/671 |
| 6,067,477 A | 5/2000 | Wewalaarachchi et al. | 700/83 |
| 6,256,676 B1 | 7/2001 | Taylor et al. | 709/246 |
| 6,473,748 B1 | 10/2002 | Archer | 706/45 |
| 6,477,434 B1 | 11/2002 | Wewalaarachchi et al. | 700/83 |
| 6,601,072 B1 | 7/2003 | Gerken, III | 707/103 R |
| 6,606,744 B1 * | 8/2003 | Mikurak | 717/174 |
| 6,697,809 B2 | 2/2004 | Chen et al. | 707/10 |
| 6,701,345 B1 | 3/2004 | Carley et al. | 709/205 |
| 6,742,015 B1 | 5/2004 | Bowman-Amuah | 709/101 |
| 6,836,889 B1 | 12/2004 | Chan et al. | 719/310 |
| 6,901,346 B2 | 5/2005 | Tracy et al. | 702/181 |
| 6,941,472 B2 | 9/2005 | Moriconi et al. | 713/201 |

(Continued)

OTHER PUBLICATIONS

Zabihollah Rezaee, Charles Hoffman, Norman Marks. (Aug. 2001). XBRL: Standardized electronic financial reporting. The Internal Auditor, 58(4), 46-51. Retrieved Jul. 15, 2008, from ABI/INFORM Global database. (Document ID: 77437507).*

(Continued)

*Primary Examiner* — Jonathan G Sterrett
*Assistant Examiner* — Folashade Anderson
(74) *Attorney, Agent, or Firm* — Blank Rome LLP (57) ABSTRACT

A system and method for managing internal controls within a heterogeneous enterprise environment is provided. The invention may include an open and extensible standards-based architecture that may be used to create, monitor, test, or otherwise manage internal controls by capturing, organizing, translating, and exchanging controls data, tests, and test results across organizational boundaries and between an enterprise and its external auditors. By providing an automated software solution for managing internal controls, business, finance, information technology, audit, or other professionals may automate on-demand testing, or perform closed-loop remediation and continuous exception-based monitoring of controls within and across enterprise systems.

10 Claims, 4 Drawing Sheets

(56) References Cited

U.S. PATENT DOCUMENTS

| | | |
|---|---|---|
| 6,950,825 B2 | 9/2005 | Chang et al. .................. 707/100 |
| 6,957,110 B2 | 10/2005 | Wewalaarachchi et al. .... 700/86 |
| 6,978,247 B1 | 12/2005 | Bogart et al. ..................... 705/8 |
| 6,980,927 B2 | 12/2005 | Tracy et al. .................. 702/181 |
| 6,983,221 B2 | 1/2006 | Tracy et al. .................. 702/181 |
| 6,993,448 B2 | 1/2006 | Tracy et al. .................. 702/119 |
| 7,028,225 B2 | 4/2006 | Maso et al. ..................... 714/47 |
| 7,089,584 B1 | 8/2006 | Sharma ............................ 726/4 |
| 7,207,041 B2 * | 4/2007 | Elson et al. ................... 718/104 |
| 2003/0229884 A1 | 12/2003 | Carr et al. .................... 717/101 |
| 2004/0177053 A1 | 9/2004 | Donoho et al. ................. 706/47 |
| 2005/0080702 A1 * | 4/2005 | Modi .............................. 705/36 |
| 2005/0209876 A1 | 9/2005 | Kennis et al. ..................... 705/1 |
| 2005/0223392 A1 * | 10/2005 | Cox et al. ...................... 719/328 |
| 2006/0129441 A1 * | 6/2006 | Yankovich et al. ............... 705/8 |
| 2006/0265760 A1 | 11/2006 | Daemke et al. ................ 726/27 |
| 2007/0078701 A1 * | 4/2007 | Bliznak .......................... 705/11 |
| 2008/0082377 A1 * | 4/2008 | Kennis et al. ..................... 705/7 |

OTHER PUBLICATIONS

Approva Expands Standards-Based Approach to Enterprise Controls Management with Release of BizRights Authoring Studios; Next-Generation Authoring Solutions Support Open Controls Framework and Enable Companies and Their Auditors to Expand the Scope of Controls Management Programs. (May 15). PR Newswire, Lu, Xudong, Huilong DuRetrieved Jul. 15, 2008.*

Lu, Xudong, Huilong Duan, Zhengxin Huang, and Ning Deng. The Design of Formatted Report Language and Its Applications in Medical Information Systems. Engineer in Medicine and Biology 27th Annual Conference, Sep. 1, 2005, IEEE. Hangzhou Zhejiang: IEEE, 2005.*

"Approve Product." Approva Greater Visibility. Better Accountability. Dec. 2003. Jul. 14, 2008 <www.approva.net>. Retrieved from http://web.archive.org.*

* cited by examiner

SYSTEM AND METHOD FOR MANAGING CONTROLS WITHIN A HETEROGENEOUS ENTERPRISE ENVIRONMENT

CROSS-REFERENCE TO RELATED APPLICATIONS

This application claims priority to U.S. Provisional Patent Application Ser. No. 60/796,186, entitled "Systems and Methods for Enterprise Controls Management," filed May 1, 2006, which is incorporated herein by reference in its entirety.

FIELD OF THE INVENTION

The invention relates to an open and extensible framework for managing business controls within a heterogeneous enterprise environment.

BACKGROUND OF THE INVENTION

Many businesses, enterprises, and other organizations often implement internal business controls to minimize risk of injury, damage, or other losses caused by business processes. For instance, to reduce the likelihood of potential fraud in financial reporting for public companies and external auditors, the Committee of Sponsoring Organizations of the Treadway Commission (COSO) recommends that entities adopt internal controls to provide reasonable assurances regarding the achievement of various business objectives. The controls may be determined by an entity's board of directors, management, or other personnel, and may relate to the effectiveness and efficiency of operations, reliability of financial reporting, or compliance with applicable laws and regulations, among other things. In response to changing economic trends, highly-public corporate scandals, and increasing government regulation, controls become critical to running an efficient and effective enterprise. For example, in a sluggish economy, controls may be designed to reduce or minimize losses or overhead, so that profits can increase without substantial revenue growth. Further, controls may be used to alert managers, analysts, regulators, or shareholders when problems occur, such that the problems can be dealt with before metastasizing into a corporate scandal.

Furthermore, controls can be useful in ensuring availability of documentation and proof of compliance with government regulation. For example, under the Sarbanes-Oxley Act, senior managers must certify their responsibility for disclosure controls and procedures, produce a control report, provide real-time disclosures of material events, and certify the accuracy of financial statements, among other things. For many organizations, initial efforts to comply with Sarbanes-Oxley were often associated with large amounts of manpower, tedious manual processes, and other costly and time-consuming approaches. As such, the rigorous regulatory requirements have resulted in many organizations implementing new processes for documenting, testing, remediating, monitoring, and otherwise managing controls.

Implementing controls, however, presents a separate set of issues from subsequently ensuring actual control compliance. For instance, in many large businesses, enterprises, or other organizations, controls tend to apply within an organization (e.g., across organizational boundaries), as well as between organizations (e.g., between a company and its external auditor). As such, controls compliance can be viewed as a business problem with multiple stakeholders, including corporate executives, business process owners, internal auditors, and external auditors, among others. Although controls compliance is a business problem by nature, information technology plays a significant role when organizations manage controls using various enterprise systems or software applications (e.g., an organization may have systems or applications for Enterprise Resource Planning (ERP), Supply Chain Management (SCM), Identity Management (IDM), Business Process Management (BPM), or Customer Relationship Management (CRM), among various others).

The systems and applications used by any given organization, however, may be highly heterogeneous. For example, systems and applications for managing an enterprise may often be provided by different vendors (e.g., Oracle®, PeopleSoft®, Siebel®, SAP®, etc.), each of which may be associated with unique, complex, or proprietary aspects that require specialists to administer or decipher. An effective and successful cross-functional operation, however, requires an open and collaborative communication solution. When all parties operate with the same information and the same guidelines, the chances for efficiency and accuracy can be greatly enhanced.

Further, as outlined in COSO's Internal Control Framework, and as required by Sarbanes-Oxley, organizations must monitor and attest to the reliability of their internal controls. When organizations have multiple, complex enterprise systems or applications to assess, each of which may generate substantial volumes of data, ongoing regulatory compliance becomes costly and time-consuming, potentially introducing risks of significant drops in shareholder value, or even criminal liability.

SUMMARY OF THE INVENTION

The invention addressing these and other drawbacks and challenges may comprise a system and method for managing controls within a heterogeneous enterprise environment. The invention may include, among other things, an open and extensible framework that may be used to create, monitor, test, or otherwise manage controls by capturing, organizing, translating, and exchanging controls data, tests, and test results across organizational boundaries and between an enterprise and its external auditors. By providing an automated software solution for managing internal enterprise controls, business, finance, information technology, audit, or other professionals may automate on-demand testing, or perform closed-loop remediation and continuous exception-based monitoring of controls within and across enterprise systems.

According to various aspects of the invention, an open controls framework for managing controls in a heterogeneous enterprise environment may use various XML-based formats, including Controls Definition Language (XCDL) and Controls Reporting Language (XCRL) to handle communication in the framework. The framework may further include one or more components that collectively make testing, remediation, publishing, and monitoring of internal controls an open and automated process. The components, which may include an integration layer, a foundation services layer, a controls authoring suite, and an enterprise controls suite, among others, may be implemented within a service-oriented architecture providing core services for an enterprise controls management solution. By standardizing data formats used in various enterprise systems and applications, controls solutions implemented using the framework may integrate and interoperate within a large and complex corporate IT environment.

According to various aspects of the invention, the integration layer may capture and normalize controls data from any enterprise application or system, including proprietary applications or systems, as well as organization-specific applications or systems. The integration layer may interact with any such system or application using an adapter framework associated with an XML interchange format, which may enable data to be gathered from any source and transformed into XCDL. The adapter framework may behave as a request broker by handling requests for data (e.g., a request may be channeled to an appropriate application or system, and data or other results may be returned to a requesting application or system). As such, the integration layer may be used to capture and exchange data without regard to intra-organizational or cross-organizational boundaries. Once data has been imported by the integration layer and formatted into XCDL, the formatted data may be published to the foundation services layer for further processing.

According to various aspects of the invention, the foundation services layer may provide an underlying foundation for managing and processing controls data. Designed for flexible deployment, high performance, and scalability, the services provided by the foundation services layer may span many different categories and may be designed to meet specific needs for any given organization. For example, the foundation services layer may provide security and user management services, data analysis and correlation services, request services, scheduling and task management services, data management or access services, reporting services, and publishing services, among various others.

According to various aspects of the invention, the controls authoring suite may enable organizations and their external auditors and clients to use a simple mechanism for creating and tailoring control data schemas, test conditions, reports, and integration APIs, among other things. The controls authoring suite may be designed to enable establishment of a community where control data and test procedures can be shared (e.g., between different IT systems or users within an organization, or between the organization and external auditors, or otherwise), thus reducing a number of variables associated with controls management. In order to effectively standardize interfaces, the controls authoring suite may include one or more authoring studio workbenches, which may be used to modify or create solutions for testing, monitoring, or otherwise managing business controls. For example, in various implementations, the authoring studio workbenches may include a rule studio, an insight studio, an integration studio, and a report studio.

According to various aspects of the invention, the rule studio may include a secure environment and an easy to use graphical user interface (GUI) for building consistent rules for all of an organization's controls, across all applications and systems. The rule studio may use a common data format (e.g., XCDL) for acquiring and normalizing data, where the common format may be standardized for organizations and their auditors to exchange application control data. With the GUI, users may create and edit rules, and may organize the rules within containers (e.g., rule books) for easier management and administration. As such, rules may be presented or otherwise displayed using easy to understand user interface rule templates. Security settings or permissions may be defined to ensure that entities accessing the rules or controls are authorized to do so. Rules created using rule studio may be exported (e.g., to an XML file) for sharing with other systems, applications, or external auditors. The rule studio may also include a utility that can be incorporated into other applications that may be more familiar to a user (e.g., a spreadsheet application, such as Microsoft Excel), thereby providing users with an option of working in a familiar application when developing rules for testing business controls. Once rules have been defined, the rules may be exported and uploaded directly into the framework, or exported into other applications or systems, and subsequently edited and reloaded into the framework.

According to various aspects of the invention, the insight studio may provide an authoring environment that enables users to build customized analysis and data schemas for any application or system, including legacy applications or systems. A standard approach may be provided for creating standardized, packaged application solutions for testing, monitoring, and remediating internal controls for specific applications or business processes. The packaged solutions may include data schemas, reports, and rules, among other things, which may implemented in a standardized format. The standardized format may enable information to be collected from an application, relationships among business objects to be presented via a user-friendly interface, and testing of the business objects using business control rules. The insight studio may include various default packaged solutions, which may be based on common business processes, best practices, or industry standard rules, among other factors, as will be apparent. The insight studio may further include a wizard-based design tool that may enable application developers or audit savvy developers to create new solutions, or customize existing or default solutions, to expand a reach of analysis available within the framework. Accordingly, the insight studio may simplify organizational tasks (e.g., defining data or configuration settings) by providing a project based environment facilitating development of custom solutions, which may easily be deployed to update the framework.

According to various aspects of the invention, the integration studio may leverage the framework by integrating distinct enterprise systems or applications with the framework. The integration studio may enable seamless communication between the framework and other aspects of an organization's software landscape, including Identity Management (IDM) systems, business process management systems, Governance and Risk Compliance (GRC) systems, portals, or other legacy applications. The integration studio may acquire and normalize data from various enterprise applications or systems for controls documentation, testing, and reporting, among other things. For example, the integration studio may include an application integration kit defining custom interfaces for capturing or otherwise importing application data into the framework. The application kit may include one or more XML schema definitions for mapping source application data to a control data model ready for consumption by the framework. In another example, an IDM integration kit may extend controls associated with the framework into an enterprise IDM system, thus providing a single control source for maintaining all organizational identities. In yet another example, a GRC integration kit may enable one or more business control rules associated with the framework to be mapped to one or more controls managed in other, distinct GRC solutions. Once the mapping has been established, publishing add-ins may be implemented to automatically push information from the framework to a central repository. In still another example, a portal integration kit may provide entry points (e.g., APIs) describing how external applications can connect to the framework. For example, as organizations consolidate information to corporate portals to ease burdens of locating information, and to better secure the information, the portal integration kit may be used to configure information retrieval for presentation in an organizational portal.

According to various aspects of the invention, the report studio may utilize XML data schemas and a data dictionary to provide a framework for developing custom reports using any suitable reporting solution, including legacy reporting tools. The report studio may include one or more tools that enable enterprise developers to integrate applications, provide custom reports to meet specific business needs, or automatically share data from an application associated with the framework, among other things. For example, reports may be generated, shared, or otherwise published using a standard format (e.g., XCRL), which may provide a common XML-based taxonomy. For instance, XCRL may be used to generate Instance Documents (e.g., business reports) having embedded controls-related information, where meanings of values included in an Instance Document may be explained by the taxonomy. As such, controls information may be published or otherwise communicated to virtually any consumer or data repository. For example, once appropriate mappings have been established using the integration studio, controls information may be communicated to GRC documentation systems, data warehouses or repositories, report distribution systems, or audit workpaper systems, among others. As such, information may be shared via a common and reusable interface, which may be used by any enterprise user, application, or system having appropriate permissions. Further, by using XCRL, all controls violations information can be described in a common format, and information can easily be correlated back to financial reporting (e.g., using XBRL or other reporting structures).

According to various aspects of the invention, the enterprise controls suite may be used to automate controls testing, or monitor and remediate against specific systems, applications, and processes, among other things. Any given organization may implement any of various types of controls, which may be implemented using a common XML-based format designed specifically for processing controls-related data. For example, the XML-based format may be XCDL, which provides a common controls definition language enabling users to share, combine, and publish controls across business processes, infrastructures, platforms, and regulations. Accordingly, the framework may reduce audit and compliance costs by leveraging inherent cost savings of collaboration and authoring, improve communication by enabling business managers, IT managers, auditors, and others to speak a common language, and reduce risk of non-compliance by improving audit quality and reliability via standardized formats.

Other objects and advantages of the invention will be apparent to those skilled in the art based on the following drawings and detailed description.

DETAILED DESCRIPTION

Figure 1:
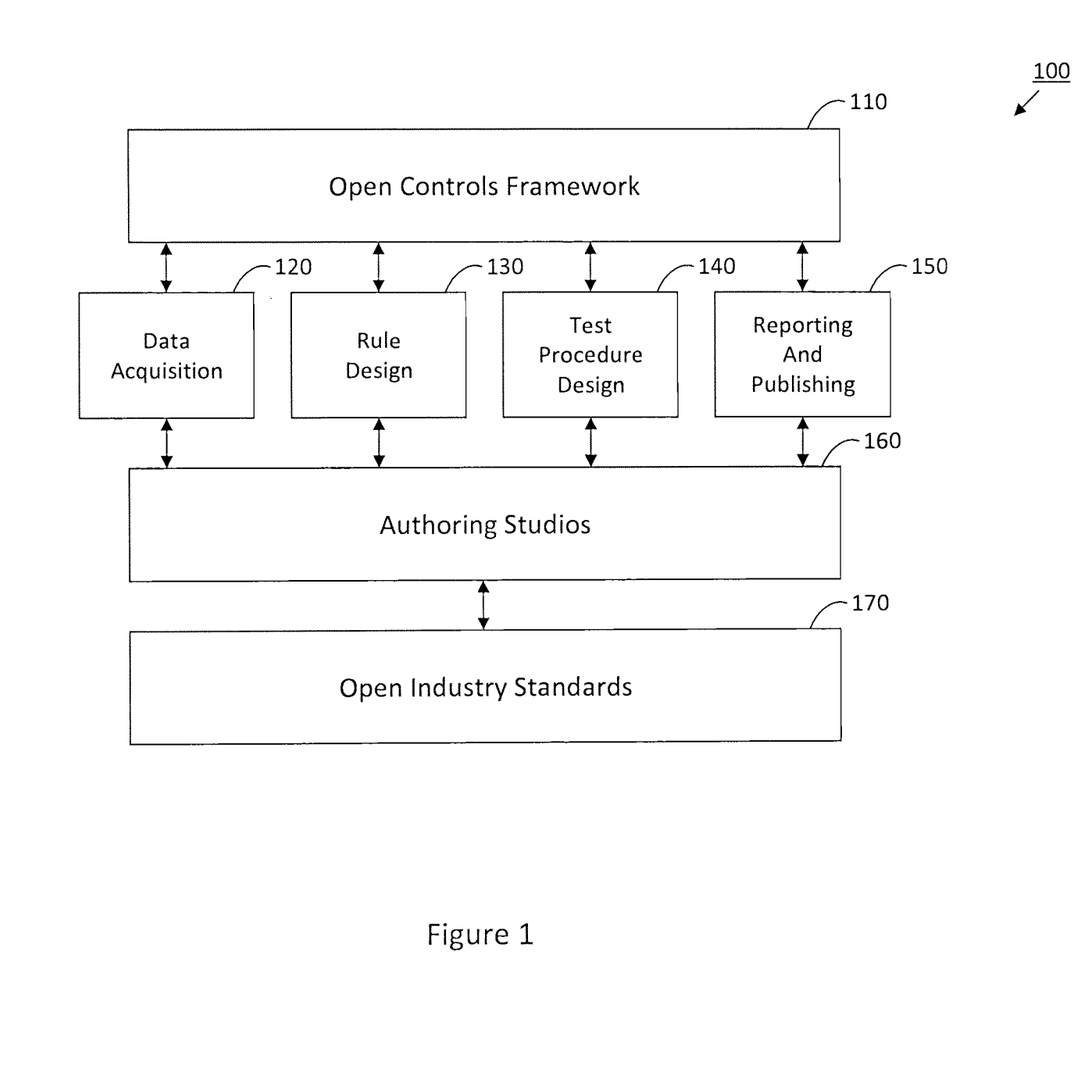
FIG. 1 illustrates an exemplary architecture for managing controls in a heterogeneous enterprise environment according to various aspects of the invention.

According to various aspects of the invention, as illustrated in FIG. 1, for example, an open controls architecture 100 may be used to manage controls in a heterogeneous enterprise environment. Architecture 100 may be used to create, monitor, test, or otherwise manage internal controls by capturing, organizing, translating, and exchanging controls data, tests, and test results across organizational boundaries and between an enterprise and its external auditors. As such, open controls architecture 100 may provide an automated software solution for managing enterprise controls, thus enabling business, finance, information technology (IT), audit, or other professionals to automate on-demand testing and perform closed-loop remediation and continuous exception-based monitoring of controls within and across enterprise systems.

Open controls architecture 100 may include open controls framework 110, which may be based upon one or more open industry standards 170. By integrating various application program interfaces (APIs) (e.g., for data acquisition 120, rule design 130, test procedure design 140, and reporting and publishing 150) with open industry standards 170, controls data may be captured and analyzed from any application or system. As such, designing, testing, remediating, publishing, monitoring, and otherwise managing internal controls may be an open and automated process that may be simple and cost effective to set up and maintain. Furthermore, architecture 100 may include various authoring studios 160, which may be used to create or tailor control data schemas, test conditions, reports, or integration APIs, among other things.

Open controls architecture 100 may therefore make it easier for enterprises and their auditors to interact, simplifying how they design and analyze controls, report control exceptions, and audit key application and operational controls, among other things. For example, architecture 100 may overcome drawbacks of inflexible, proprietary, "hard-coded" controls solutions by using a standards-based approach, such that an organization can rapidly design and deploy optimized enterprise controls specific to the organization and its business processes. Further, finance, business, and IT professionals within the organization, as well as external auditors and clients of the organization, among others, can all speak a common language, and implement a consistent approach to managing controls, regardless of control types, underlying infrastructure, business processes, or other factors. Accordingly, architecture 100 may reduce costs associated with regulatory compliance, among achieving other advantages, by decreasing the time and expense associated with implementing, monitoring, and auditing enterprise controls.

Figure 2:
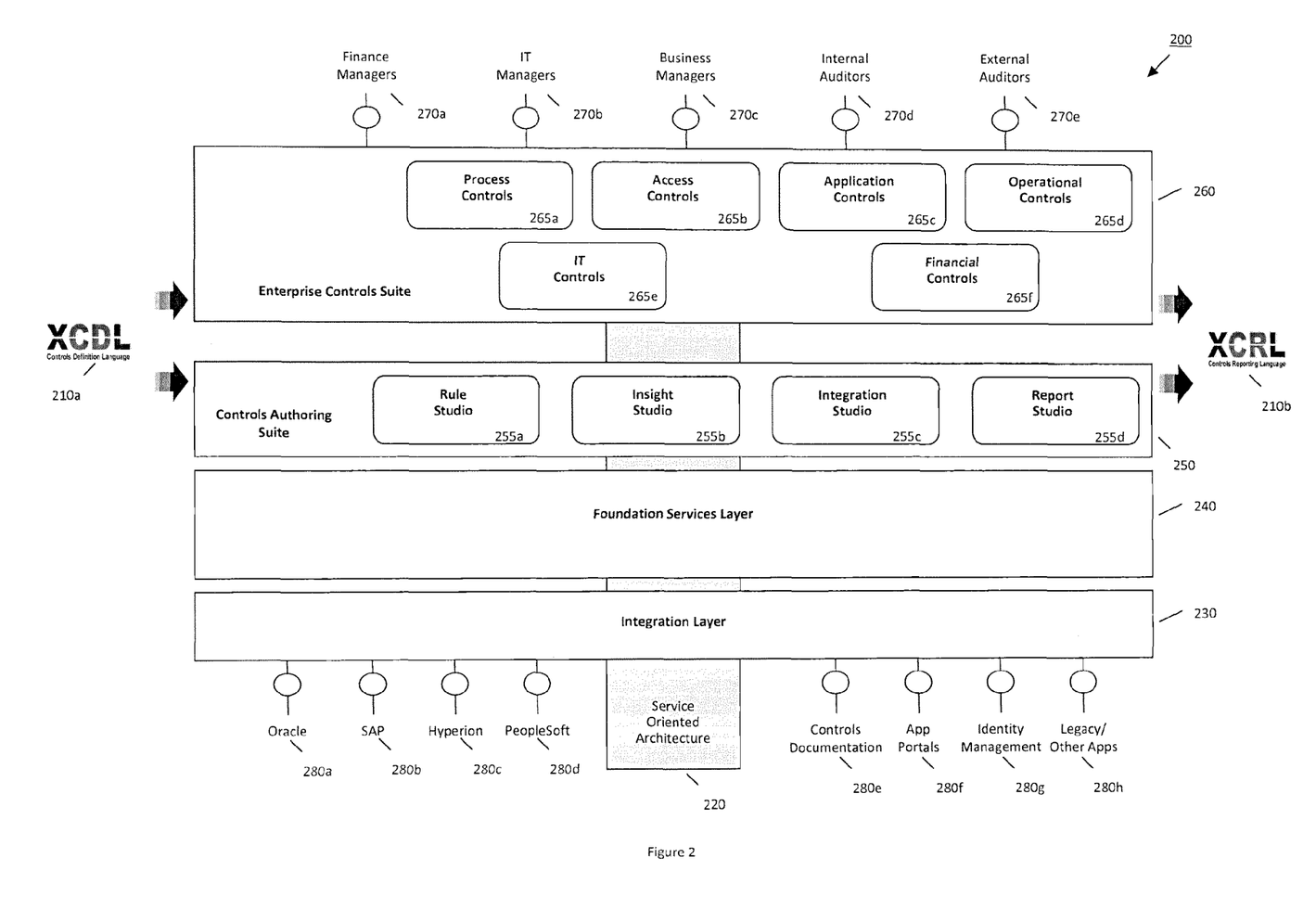
FIG. 2 illustrates an exemplary service oriented architecture for managing controls in a heterogeneous enterprise environment according to various aspects of the invention.

Referring to FIG. 2, an exemplary open controls framework 200 for managing controls in a heterogeneous enterprise environment is illustrated according to various aspects of the invention. Framework 200 may fully integrate various open standards, such as extensible Markup Language (XML), Simple Object Access Protocol (SOAP), HyperText Transfer Protocol (HTTP), or Lightweight Directory Access Protocol (LDAP), or various other standards, as will be apparent. By integrating various standards that may be used in various enterprise systems and applications, controls solutions implemented using framework 200 may easily integrate and interoperate within a large and complex corporate IT environment.

Communication in framework 200 may be based upon various XML-based formats (e.g., Controls Definition Language (XCDL) 210a, Controls Reporting Language (XCRL) 210b, or other XML-based formats), which may enable integration and interoperability within framework 200 and other control systems. For example, an auditor can reduce its attestations by performing an on-site assessment of an enterprise's control tests (e.g., by applying the auditor's control tests created using XCDL 210a to the enterprise's control tests, also created using XCDL 210a). In another example, control data from various applications or systems can be shared with an external entity (e.g., an auditor) by encapsulating data using XCDL 210a and/or XCRL 210b. As enterprises, auditors, and others interact using the common formats, which may include but will not be limited to XCDL 210a and XCRL 210b, best practices and controls information may be broadly shared among industry consortiums and interested parties, thus providing various advantages, such as increasing effectiveness and reducing costs of compliance activities.

In addition to being using common XML-based formats, framework 200 may include a number of components that collectively make testing, remediation, publishing, and monitoring of internal controls an open and automated process. The components may be implemented using a service oriented architecture 220, which may provide core services for an enterprise controls management solution. For example, the components of service oriented architecture 220 may include, among other things, an integration layer 230, a foundation services layer 240, a controls authoring suite 250, and an enterprise controls suite 260. As such, framework 200 may be used to attain cost-effective controls monitoring and testing across a heterogeneous mix of IT systems and applications, as described in greater detail below.

Integration layer 230 may capture and normalize controls data from any application or system. For example, any given organization may include various proprietary applications or systems (e.g., Oracle 280a, SAP 280b, Hyperion 280c, or PeopleSoft 280d, among others), as well as various applications or systems designed for the organization's specific needs (e.g., controls documentations 280e, application portals 280f, identity management (IDM) systems 280g, or other legacy systems and applications 280h). Integration layer 230 may interact with any such system or application using an adapter framework, which is described in greater detail in U.S. patent application Ser. No. 11/244,060, entitled "Systems and Methods for Monitoring Business Processes of Enterprise Applications," filed Oct. 6, 2005, which is incorporated herein by reference in its entirety. For example, the adapter framework may be associated with an XML interchange format (e.g., XML Metadata Interchange (XMI)), which may enable data to be gathered from any source and transformed into XCDL 210a.

The adapter framework may behave as a request broker by handling requests for data (e.g., a request may be channeled to an appropriate application or system, and data or other results may be returned to a requesting application or system). Moreover, the adapter framework may provide flexibility in gathering data by operating in an online mode or an offline mode. For example, when operating in the offline mode, data can be extracted to an intermediary (e.g., an encrypted file), and then transported via any suitable mechanism (e.g., file transfer, copying to a compact-disc, etc.). As such, integration layer 230 may capture and exchange data without regard to intraorganizational or cross-organizational boundaries (e.g., data may be extracted for analysis, or roles within an application may be assigned or removed as part of a remediation task, etc.). Once data has been imported by integration layer 230 and formatted into XCDL 210a, the data may be published to foundation services layer 240 for further processing.

Foundation services layer 240 may provide various services, which may provide an underlying foundation for managing and processing controls data. Designed for flexible deployment, high performance, and scalability, the services provided by foundation services layer 240 may span many different categories and may be designed to meet specific needs for any given organization. For example, foundation services layer 240 may provide security and user management services, including authentication, role-based access, data level protection, and alerts for proactively sending notifications and reports to subscribed users, among others. Further, foundation services layer 240 may provide data analysis and correlation services for applying analytics against application data, request services for handling workflow requests as a change control, scheduling and task management services for automatically executing tasks, data management or access services for requesting, storing, and archiving data, reporting services for creating and rendering reports, and publishing services for publishing information to external sources, among various others. As such, it will be apparent that the services provided by foundation services layer 240 may vary in any given deployment, without limitation, and that the services provided therein may be highly extensible and scalable.

As any given business, enterprise, or other organization will have distinct characteristics, flexibility in framework 200 becomes an important factor in continuous controls monitoring and testing. For example, due to differences in human resources associated with an organization, business processes used in the organization, or various other factors, applications and systems used by and within the organization may differ, implicating how and what gets tested accordingly. As such, controls framework 200 may be designed to establish a community where control data and test procedures can be shared, thus reducing a number of variables associated with controls management. In order to effectively standardize interfaces, however, organizations must still be able to create or customize what gets tested, how it gets tested, and who views the results thereof. Accordingly, controls authoring suite 250 may be implemented to enable organizations and their external auditors and clients to use a simple mechanism for creating and tailoring control data schemas, test conditions, reports, and integration APIs, among other things.

Controls authoring suite 250 may include one or more authoring studio workbenches 255, which finance managers 270a, IT managers 270b, business managers 270c, internal auditors 270d, and external auditors 270e, among others, may use to modify or create solutions for testing, monitoring, or otherwise managing business controls. For example, in various implementations, authoring studio workbenches 255 may include a rule studio 255a, an insight studio 255b, an integration studio 255c, and a report studio 255d. The authoring studios 255 may collectively enable cost effective controls monitoring and testing across a heterogeneous composition of IT systems and applications.

Rule studio 255a may include a secure environment and an easy to use graphical user interface (GUI) for building consistent rules for all of an organization's controls, across all applications and systems. Rule studio 255a may use a common data format (e.g., XCDL 210a) for acquiring and normalizing data, where the common format may be standardized for organizations and their auditors to exchange application control data. Users may create and edit rules and rule books (e.g., containers for collections or groups of rules) via the GUI, wherein rules may be presented or otherwise displayed using easy to understand rule user interface templates. As such, a secure environment may be provided where various interested parties may engage in collaborative, online review of controls. Further, security settings or permissions may be defined via the GUI to ensure that entities accessing the rules or controls are authorized to do so. Rules created using rule studio 255a may be exported (e.g., to an XML file) for sharing with other systems or applications.

Rule studio 255a may also include a rule utility, which may be incorporated into other applications that may be more familiar to a user. For example, the rule utility may be integrated with any suitable spreadsheet application (e.g., Microsoft Excel), thereby providing users with an option of working in a familiar application when developing rules for testing business controls. Furthermore, the rule utility may enable users to work in a disconnected (e.g., offline) manner. For example, once rules have been defined, the rules may be exported and uploaded directly into framework 200. Correlatively, rules defined using rule studio 255a and thereafter exported may be imported into other applications or systems, and subsequently edited and reloaded into framework 200.

Insight studio 255b may provide an authoring environment that enables users to build customized analysis and data schemas for any application or system, including legacy applications or systems. A standard approach may be provided for creating standardized, packaged application solutions for testing, monitoring, and remediating internal controls for specific applications or business processes. The packaged solutions may include data schemas, reports, and rules, among other things, which may implemented in a standardized format, thereby enabling collection of information from an application, presentation of the collected information via a user-friendly interface, and understanding relationships among business objects to enable testing of the business objects using business control rules.

Insight studio 255b may include various default packaged solutions, which may be based on common business processes, best practices, or industry standard rules, among other factors, as will be apparent. Many organizations, however, may have a need to customize the default solutions, or create new solutions for legacy applications or custom systems. As such, insight studio 255b may include a wizard-based design tool that may enable application developers or audit savvy developers to create new solutions, or customize existing solutions, to expand a reach of analysis available within framework 200. Accordingly, insight studio 255b may simplify organizational tasks (e.g., defining data or configuration settings) by providing a project based environment facilitating definition or customization of packaged solutions, which may easily be deployed to update framework 200.

Integration studio 255c may be used to leverage framework 200 by integrating distinct enterprise systems or applications with framework 200, thereby reducing compliance risks, and improving intra-organizational and inter-organizational communication, among other things. Integration studio 255c may enable framework 200 to communicate seamlessly across an organization's software landscape, such that an organization may integrate with framework 200 application data from other systems (e.g., IDM systems, business process management (BPM) systems, Governance and Risk Compliance (GRC) systems, portals, or other legacy applications). For example, preventative controls may be integrated with an existing IDM system, control details and documentation may be published directly to a GRC system, or violation results may be summarized for an existing portal solution, among other things.

Integration studio 255c may acquire and normalize data from various enterprise applications or systems for controls documentation, testing, and reporting, among other things. Various integration kits or utilities may be designed to facilitate integration between framework 200 and other enterprise applications or systems. For example, integration studio 255c may leverage framework 200 across organizational boundaries by providing integration kits for applications, IDM systems, GRC systems, and organizational portals, among others.

The application integration kit may define an interface for capturing or otherwise importing application data into framework 200. The application kit may include one or more XML schema definitions for mapping source application data to a control data model ready for consumption by framework 200. The application integration kit may further include one or more tools for customizing the XML schema definitions, as necessary (e.g., when a default schema definition does not fully meet an organizational requirement).

The IDM integration kit may extend controls associated with framework 200 (e.g., preventive controls for restricting user access, or defining security permissions or authorizations, etc.) into an enterprise IDM system (e.g., Sun Java™ System Identity Manager, IBM® Tivoli® Identity Manager, Oracle® Identity Manager, etc.). As such, a single control source may be maintained for all organizational identities, thereby ensuring minimal risk of unauthorized access, whether it be inadvertent or malicious. Using various web service APIs, provisioning applications may leverage various functionalities associated with framework 200, including analysis, correlation, and workflow, among others.

The GRC integration kit may enable one or more business control rules associated with framework 200 to be mapped to one or more controls managed in other, distinct GRC solutions. Once the mapping has been established, publishing add-ins may be implemented (e.g., via report studio 255d) to automatically push and/or pull information from framework 200 to a central repository.

The portal integration kit may provide entry points (e.g., APIs) describing how external applications can connect to framework 200. For example, as organizations consolidate information to corporate portals to ease burdens of locating information (e.g., key risk indicators, or key business process controls status, etc.), and to better secure the information, the portal integration kit may be used to configure information retrieval for presentation in an organizational portal.

Report studio 255d may utilize XML data and a data dictionary to provide a framework for developing custom reports using any suitable reporting solution, including legacy reporting tools. Report studio 255d may include one or more tools that enable enterprise developers to integrate applications, provide custom reports to meet specific business needs, or automatically share data from an application associated with architecture 200, among other things. For example, control violations based on rules associated with framework 200 may be shared, published, or otherwise reported using a standard format (e.g., XCRL 210b), which may provide a common XML-based taxonomy.

As will be apparent, XCRL 210b can be used within framework 200 to prepare and publish reports in a variety of formats, or exchange and analyze standardized controls information, among other things. For instance, XCRL 210b may be used to exchange and analyze financial controls by linking financial statements with corresponding controls and controls summary information. Accordingly, XCRL 210b may be used to generate Instance Documents (e.g., business reports) having embedded controls-related information, where meanings of values included in an Instance Document may be explained by the taxonomy. For example, an Instance Document may provide a summary of findings for a segregation of duties audit prepared to an XCRL 210b specification (e.g., the audit may ensure that Enterprise Resource Planning (ERP) users do not create purchase orders and enter invoices).

As such, controls information may be published or otherwise communicated to virtually any consumer or data repository. For example, once appropriate mappings have been established using integration studio 255c, controls information may be communicated to GRC documentation systems, data warehouses or repositories, report distribution systems, or audit workpaper systems, among others. As such, information may be shared via a common and reusable interface, which may be used by any enterprise user, application, or system having appropriate permissions. Further, by using XCRL 210b, all controls violations information can be described in a common format, and the information can easily be correlated back to financial reporting (e.g., using XBRL or other reporting structures).

A custom reporting tool may provide an organization with greater control over managing how reports provide information or how reports should be delivered, among other things. For example, the custom reporting tool may include a data dictionary that may describe database schemas used by framework 200 (e.g., XML schemas). Using the custom reporting tools and the data dictionary, existing reports may be modified as needed, or new reports can be created from scratch. As such, an organization may generate reports using any suitable reporting tool, including legacy tools that may be more comfortable for the organization to use.

An automated sharing tool may provide a mechanism for automatically sharing information throughout a publishing framework of framework 200. Using the automated sharing tool, developers can map external controls to controls associated with framework 200. Further, specific actions may be performed, including automatically generating reports to be shared with a master controls repository, or publishing controls violation details to a data warehouse, among other things.

Enterprise controls suite 260 may be used to automate controls testing, or monitor and remediate against specific systems, applications, and processes, among other things. Any given organization may implement any of various types of controls 265, such as process controls 265a that include transaction-specific requirements (e.g., procurement, inventory, sales order processing, financial close, payroll, etc.), access controls 265b that include user and system-specific requirements (e.g., roles, authorizations, role assignments, user activity, etc.), application controls 265c that include application-specific requirements (e.g., ERP, IDM, CRM, or other application requirements), operational controls 265d that include business process or sub-process-specific requirements (e.g., approval processes, change controls, etc.), IT controls 265e that include technology and infrastructure-specific requirements (e.g., security, disaster recovery, data quality), or financial controls 265f that include government regulation-specific requirements, among others.

Finance managers 270a, IT managers 270b, business managers 270c, internal auditors 270d, external auditors 270e, or other users may use enterprise controls suite 260 to implement controls for applications, systems, or processes of interest. The controls may be implemented using a common XML-based format, which may be designed specifically for processing controls-related data. For example, the XML-based format may be XCDL 210a, which provides a common controls definition language enabling users to share, combine, and publish controls across business processes, infrastructures, platforms, and regulations. For example, controls for testing various distinct business processes (e.g., Web Service controls on a Java stack for a Health Insurance Portability and Accountability Act (HIPAA) review, SAP purchasing configurations for a Sarbanes-Oxley review, Unix security settings for an internal audit review, etc.) can all be documented using a common format (i.e., XCDL), using XML tags specific for compliance.

Accordingly, it will be apparent from the foregoing description that framework 200 may provide various advantages over existing systems. For example, framework 200 may reduce audit and compliance costs by leveraging inherent cost savings of collaboration and authoring. Further, framework 200 may improve communication by enabling business managers, IT managers, auditors, and others to speak a "common language," and may reduce risk of non-compliance by improving audit quality and reliability via standardized formats. Other advantages will be apparent.

Figure 3:
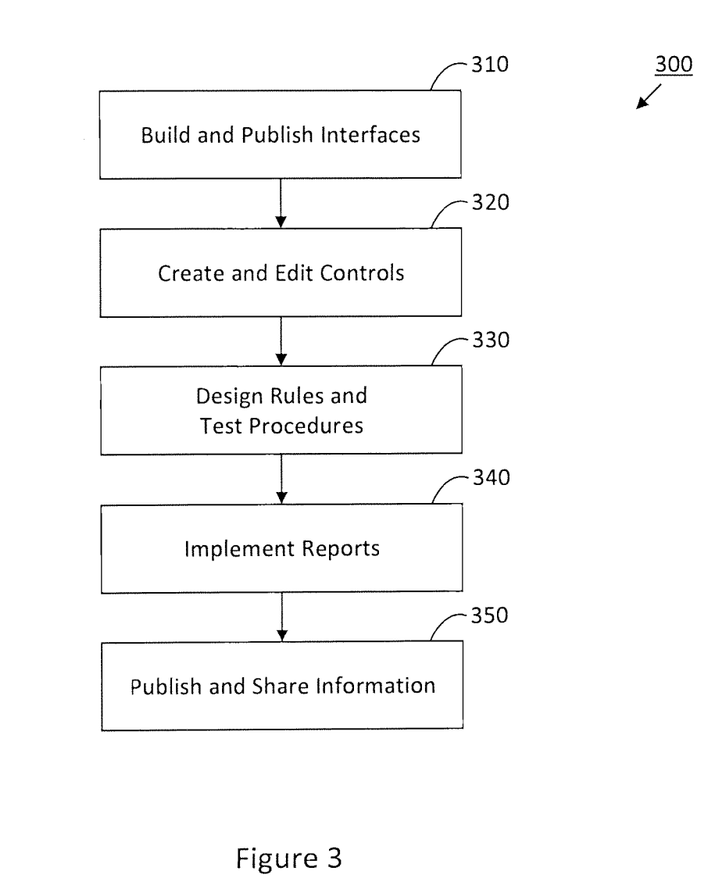
FIG. 3 illustrates an exemplary method for deploying an open controls architecture in a heterogeneous enterprise environment according to various aspects of the invention.

Referring to FIG. 3, an exemplary method 300 for deploying an open controls framework in a heterogeneous enterprise environment is illustrated according to various aspects of the invention. In an operation 310, one or more interfaces for the framework may be built and published, thereby making the framework ready for deployment in an enterprise environment. For example, interfaces among various enterprise applications or systems may be unified via an integration layer that captures and normalizes controls data from any application or system. The integration layer may interact with any such system or application using an adapter framework, which may behave as a request broker by handling requests for data. For example, the adapter framework may use an XML interchange format, such as XMI, which may enable data to be gathered from any suitable source and formatted into XCDL.

Further, operation 310 may include installing a foundation services layer in the enterprise environment to receive the XCDL formatted data from the integration layer. The foundation services layer may provide an underlying foundation for managing and processing controls data, and may provide various data services such as security and user management, data analysis and correlation, request handling, scheduling and task management, data or access management, and publishing, among various others. As such, with core services of the open controls framework being provided by the integration layer and the foundation services layer, one or more interfaces for configuring or otherwise deploying the framework may be built and published in operation 310.

In an operation 320, finance managers, IT managers, business managers, internal auditors, external auditors, or other users may create and edit controls and rules. For example, using one or more interfaces built and published in operation 310, users may implement various controls, such as process controls including transaction-specific requirements, access controls including user and system-specific requirements, application controls including application-specific requirements, operational controls including business process or sub-process-specific requirements, IT controls including technology and infrastructure-specific requirements, or financial controls including government regulation-specific requirements, among others. The controls may be implemented using a common XML-based format, such as XCDL, designed specifically for processing controls-related data.

In an operation 330, one or more users may create and edit one or more rules for testing all of an organization's controls, including any control that may be associated with any enterprise application, system, or business process. The rules and test procedures may be created and edited using a rule studio, or other suitable application, which includes a secure environment and an easy to use GUI, as built and published in operation 310, for building consistent rules and rule books. The GUI may present or otherwise display the rules and rule books using easy to understand templates. In various implementations, rules and rule books may be implemented using a rule utility, which may be incorporated into other applications (e.g., a spreadsheet application), thereby providing users with an option of working in a familiar application when developing rules for testing business controls. Once all appropriate rules and testing procedures have been defined in operation 330, the rules and the test procedures may be exported and integrated seamlessly into the open controls framework. Correlatively, rules and test procedures may be exported to other enterprise applications or systems, enabling their consistent use across intra- and inter-organizational boundaries.

In an operation 340, one or more reports may be implemented. The reports may be implemented to publish data indicative of one or more controls violation. For example, a report studio may utilize XML schema data (e.g., XCDL, XCRL) and a data dictionary to provide a framework for developing custom reports using any suitable reporting solution, including legacy reporting tools. The report studio may include one or more tools, including a custom reporting tool and an automated sharing tool, which may enable enterprise developers to integrate applications, provide custom reports to meet specific business needs, or automatically share data. For example, control violations based on testing rules against acquired and normalized data may be shared, published, or otherwise reported using a standard format (e.g., XCRL).

In an operation 350, the open controls framework may be fully deployed when integrated for publishing and sharing information. Publishing and sharing information may apply to intra-organizational activity, where various departments or groups within an organization may have encapsulated roles (e.g., a business development representative may be unaware of activity in an IT department). Further, the publishing and sharing may apply to inter-organizational communication, such as communicating data to external auditors, third-party clients, web interfaces via a portal, or otherwise. As such, operation 350 may include ensuring formatting of all data passing in or out of the open controls framework in standardized formats, thus enabling controls information, rules information, testing procedures, reports, or application or system data to be published or otherwise communicated to any suitable consumer or data repository. Accordingly, information may be published and shared via a common and reusable interface, which may be used by any enterprise user, application, or system having appropriate permissions, as well as third-party partners, auditors, clients, customers, or others.

Figure 4:
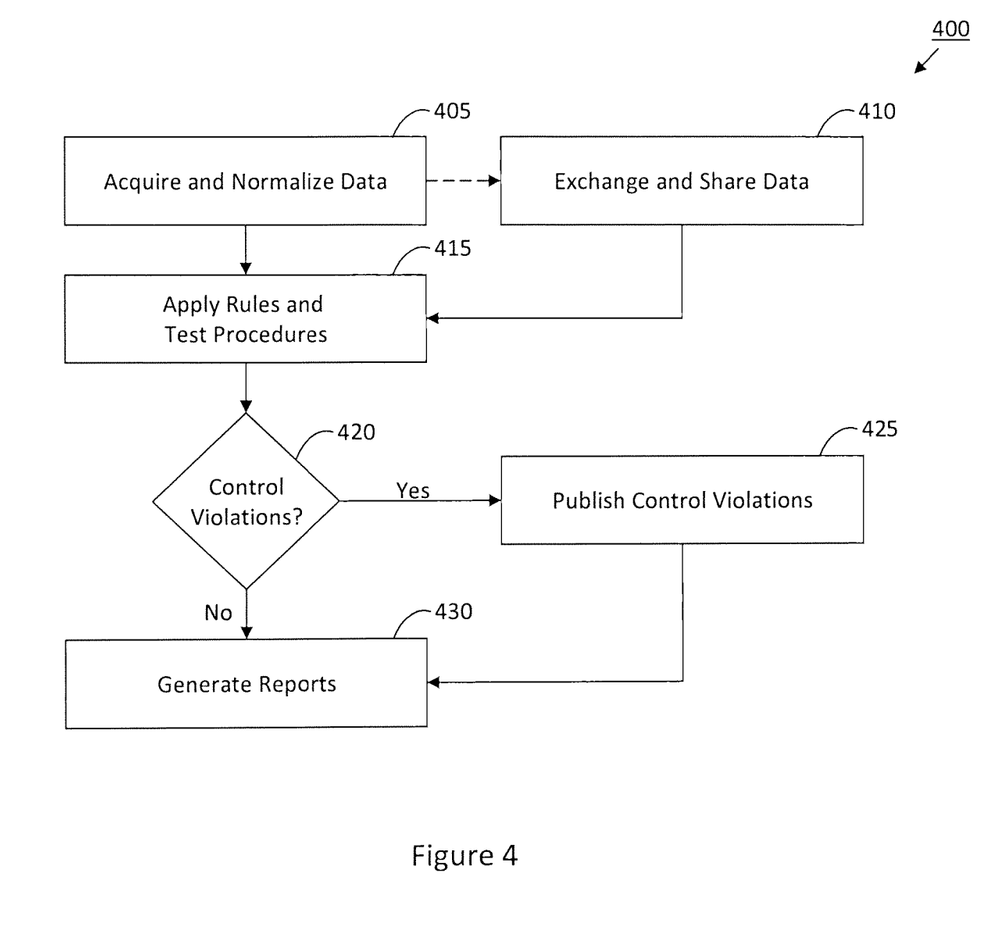
FIG. 4 illustrates an exemplary method for using an open controls architecture in an internal or external audit of a heterogeneous enterprise environment according to various aspects of the invention.

Referring to FIG. 4, an exemplary method 400 for using an open controls framework in an internal or external audit of a heterogeneous enterprise environment is illustrated according to various aspects of the invention. Upon being deployed (e.g., in accordance with the method of FIG. 3), the open controls framework may be used to audit or test organizational compliance with internal controls.

In an operation 405, data may be acquired and normalized for auditing. By using the open controls framework, audits may be fully comprehensive and reliable by accounting for data from all of an enterprise's applications or systems, as well as faster and cheaper than traditional audits by utilizing fully integrated data, applications, and systems. As data may be audited internally or externally, the open controls framework provides additional advantages, such as optionally exchanging and sharing audit data, controls data, rules, testing procedures, reporting procedures, and other data in an operation 410. The open framework may enable external auditors receiving the exchanged and shared data to be fully aware of an audit client's internal control testing. Among other advantages, clients being audited may spend far less time and effort when preparing for an audit, and costs and risks may be substantially reduced.

In an operation 415, the controls data being audited may be tested by applying one or more rules and testing procedures to the data. Using the open controls framework, application of rules and testing procedures in operation 415 may be a standardized and uniform procedure. For example, many large enterprises and conglomerate organizations face burdens of conducting a consistent internal audit and self assessment across departments, divisions, and business boundaries. Further, public accounting and audit firms face similar challenges across hundreds or thousands of audit clientele. Using the open controls framework, however, auditors can perform a uniform set of tests and can follow a uniform methodology. As such, regardless of whether the audit relates to an internal or external audit, the uniform testing and audit procedures may result in a more accurate and consistent set of risk measurements, thereby reducing an overall risk of noncompliance by improving quality and reliability of audits.

In a decisional operation 420, a determination may be made as to whether the application of rules or testing procedures during performed in operation 415 resulted in any controls violations. Upon determining that no controls violations have occurred, one or more reports may be generated and published in an operation 430 to report final results of the audit. Upon determining that controls violations have occurred, however, the reports generated and published in operation 430 may be supplemented by reports of the controls violations, which may be generated and published in an operation 425.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A computer-implemented system for managing controls within a heterogeneous enterprise environment using a service-oriented open controls architecture, the system comprising:
   one or more processors;
   an integration component implemented on the one or more processors configured to:
      import, from a plurality of heterogeneous enterprise applications, user role information that describes authorizations or permissions assigned to one or more users in the plurality of heterogeneous enterprise applications;
      import, from the plurality of heterogeneous enterprise applications, business transaction information that describes one or more business process activity instances in the plurality of heterogeneous enterprise applications;
      import, from the plurality of heterogeneous enterprise applications, configuration information that describes one or more internal control settings that govern usage in the plurality of heterogeneous enterprise applications and indicate what the plurality of heterogeneous enterprise applications are allowed to do; and
      normalize the user role information, the business transaction information, and the configuration information imported from the plurality of heterogeneous enterprise applications into a predetermined format;
   a foundation services component configured to store the user role information, the business transaction information, and the configuration information imported from the plurality of heterogeneous enterprise applications in the predetermined format and provide one or more services to manage and process the user role information, the business transaction information, and the configuration information;
   a controls authoring suite implemented on the one or more processors, wherein the controls authoring suite includes one or more studios configured to:
      receive one or more inputs to the one or more studios to author a role management rule, a business transaction rule, and a configuration rule;
      load the role management rule into the service-oriented open controls architecture to test the normalized user role information, the normalized business transaction information, and the normalized configuration information for compliance with one or more access controls;
      load the business transaction rule into the service-oriented open controls architecture to test normalized user role information, the normalized business transaction information, and the normalized configuration information for compliance with one or more process or operational controls; and
      load the configuration rule into the service-oriented open controls architecture to test the normalized user role information, the normalized business transaction information, and the normalized configuration information for compliance with one or more application controls; and
   an enterprise controls component implemented on the one or more processors and configured to:
      apply the role management rule to the normalized user role information, the normalized business transaction information, and the normalized configuration information to test whether the authorizations or permissions assigned to the one or more users violate the role management rule or comply with the one or more access controls;
      apply the business transaction rule to the normalized user role information, the normalized business transaction information, and the normalized configuration information to test whether the business process activity instances violate the business transaction rule or comply with the one or more process or operational controls; and
      apply the configuration rule to the normalized user role information, the normalized business transaction information, and the normalized configuration information to test whether the internal control settings violate the configuration rule or comply with the one or more application controls.

2. The system of claim 1, wherein the one or more services that the foundation services component provides to manage and process the user role information, the business transaction information, and the configuration information include security and user management services to authenticate, provide role-based access, protect data levels, and alert the one or more users in the plurality of heterogeneous enterprise applications, data analysis and correlation services to apply analytics against the user role information, the business transaction information, and the configuration information imported from the plurality of heterogeneous enterprise applications, request services to handle workflow requests and change controls in the plurality of heterogeneous enterprise applications, scheduling and task management services to automatically execute tasks in the service-oriented open controls architecture, data management or access services to request, store, and archive the user role information, the business transaction information, and the configuration information imported from the plurality of heterogeneous enterprise applications, reporting services to create and render reports that relate to compliance with the role management rule, the business transaction rule, and the configuration rule, and publishing services to publish information to one or more sources external to the heterogeneous enterprise environment.

3. The system of claim 1, wherein the enterprise controls component is further configured to test the normalized user role information, the normalized business transaction information, and the normalized configuration information to determine whether the internal control settings violate or comply with one or more information technology controls that define requirements associated with an information technology infrastructure in the heterogeneous enterprise environment.

4. The system of claim 1, further comprising a portal that provides an application program interface to connect the service-oriented open controls architecture with one or more applications external to the heterogeneous enterprise environment and share data relating to the user role information, the business transaction information, and the configuration information imported from the plurality of heterogeneous enterprise applications with the one or more external applications.

5. The system of claim 4, wherein the enterprise controls component is further configured to apply one or more external auditor controls received from the one or more external applications to the one or more access controls, the one or more process or operational controls, and the one or more application controls to facilitate an external audit on the heterogeneous enterprise environment, wherein the one or more external auditor controls, the one or more access controls, the one or more process or operational controls, and the one or more application controls have a common XML-based Controls Definition Language format.

6. The system of claim 5, wherein the foundation services component is further configured to:

encapsulate a report that documents and proves compliance or violations associated with the one or more access controls, the one or more process or operational controls, and the one or more application controls using a common XML-based Controls Reporting Language format; and publish the encapsulated report to the one or more external applications to facilitate the external audit.

7. The system of claim 1, wherein the one or more studios associated with the controls authoring suite include a rule studio configured to receive the one or more inputs to author the role management rule, the business transaction rule, and the configuration rule.

8. The system of claim 7, wherein the one or more studios associated with the controls authoring suite further include an insight studio configured to:

deploy a custom data schema into the service-oriented open controls architecture to define the predetermined format used to normalize the imported user role information, the imported business transaction information, and the imported configuration information; and deploy a custom analysis schema into the rule studio to use in authoring the role management rule, the business transaction rule, and the configuration rule.

9. The system of claim 8, wherein the one or more studios associated with the controls authoring suite further include an integration studio configured to map source data associated with the plurality of heterogeneous enterprise applications to a control data model used in the service-oriented open controls architecture, wherein the control data model includes the custom data schema and the custom analysis schema that the insight studio deploys into the service-oriented open controls architecture.

10. The system of claim 9, wherein the one or more studios associated with the controls authoring suite further include a report studio configured to provide a common data dictionary and XML-based taxonomy to develop custom reports that document whether the imported user role information, the imported business transaction information, and the imported configuration information comply with or violate the one or more access controls, the one or more process or operational controls, and the one or more application controls.

* * * * *